FIG. I

INVENTOR.
ROY GORDON HEATON

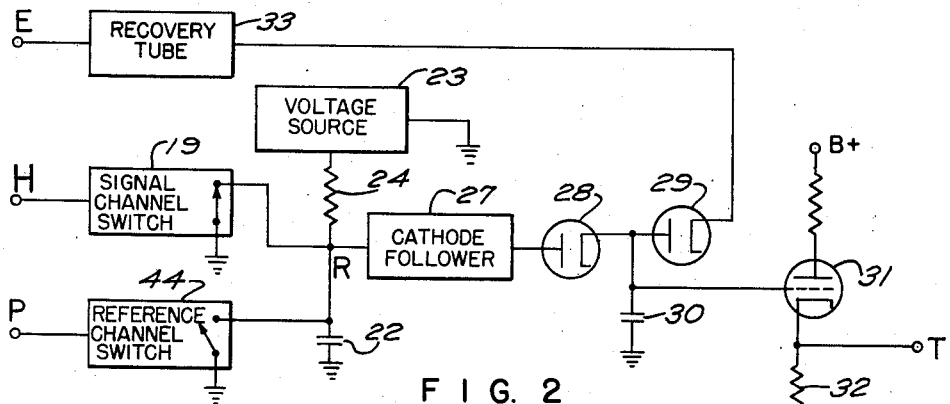
FIG. 2
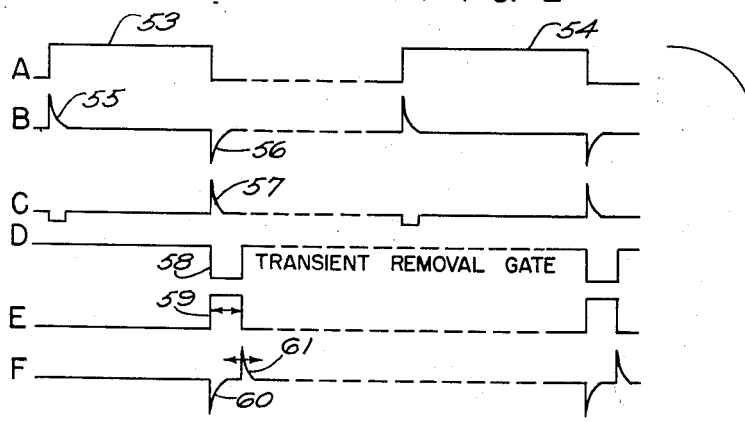
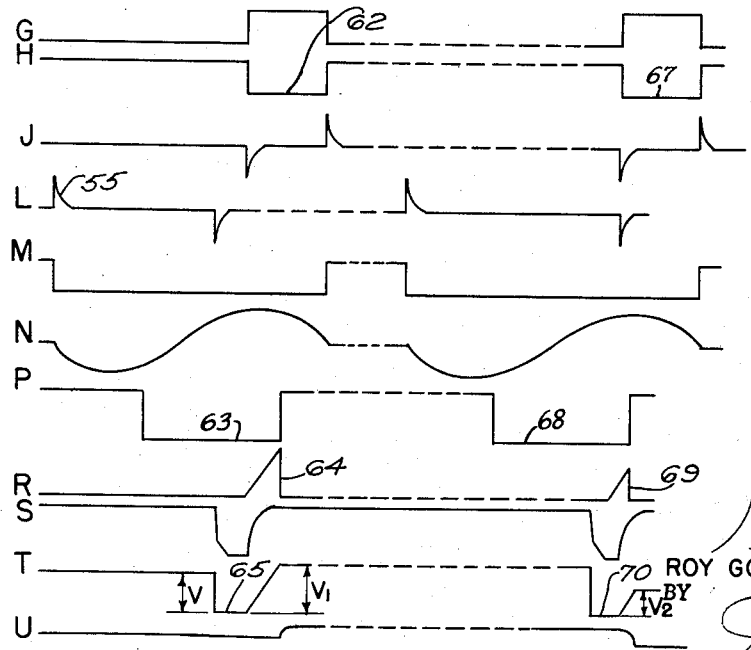
FIG. 3
INVENTOR.
ROY GORDON HEATON
BY
Joseph Weingarten
ATTORNEY

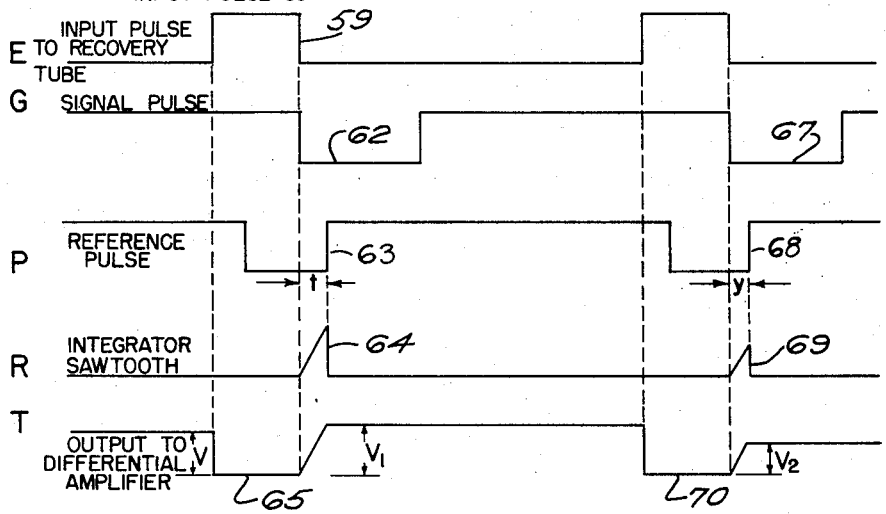
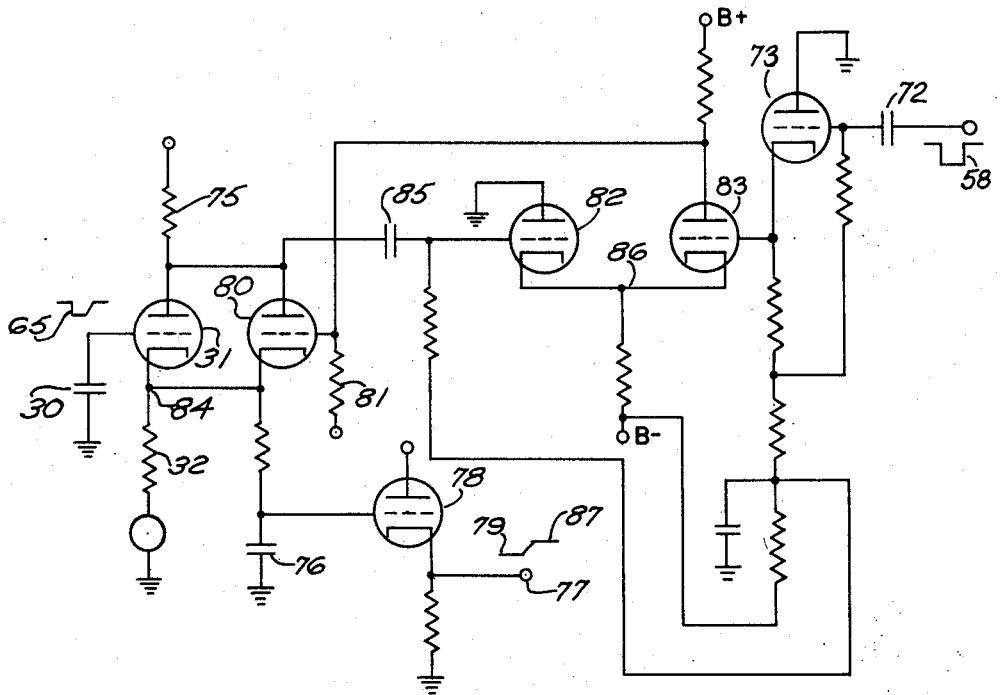

Oct. 16, 1962     R. G. HEATON     3,059,179
SIGNAL ANALYSIS APPARATUS
Filed Aug. 7, 1959     6 Sheets-Sheet 4

RELATIVE JITTER MEASUREMENT

INVENTOR.
ROY GORDON HEATON
BY
ATTORNEY

United States Patent Office 3,059,179
Patented Oct. 16, 1962

3,059,179
SIGNAL ANALYSIS APPARATUS
Roy Gordon Heaton, Topsfield, Mass., assignor to Laboratory For Electronics, Inc., Boston, Mass., a corporation of Delaware
Filed Aug. 7, 1959, Ser. No. 832,227
20 Claims. (Cl. 324—68)

This invention relates in general to apparatus for measuring the time stability of repetitively generated pulses and more particularly pertains to a system having modes of operation permitting the measurement of pulse width jitter, relative jitter, and pulse repetition rate jitter.

The invention resides in a system which derives a reference switch pulse either from an input signal or from an internal stable oscillator and in which a signal switch pulse is derived from each pulse subject to the jitter measurement. The position of the signal switch pulse in relation to the position of the reference switch pulse varies in accordance with the jitter of the subject pulse. A capacitor is arranged to charge from a datum level only during the time between the signal switch pulse and the reference switch pulse. The peak charge on the capacitor is detected and the detected signal is held in a storage capacitor. Shortly before the next measurement is made, the storage capacitor is discharged by a recovery tube. Output signals derived from the storage capacitor are applied to a meter and the deflection of the meter's pointer indicates pulse jitter. The output derived from the storage capacitor may also be viewed on an oscilloscope. To prevent inaccurate indications by the meter due to the discharging of the storage capacitor shortly before each measurement is made, a transient removal system is provided which in large measure reduces the unwanted effects of the transients caused by the discharge of the storage capacitor.

Figure 1:
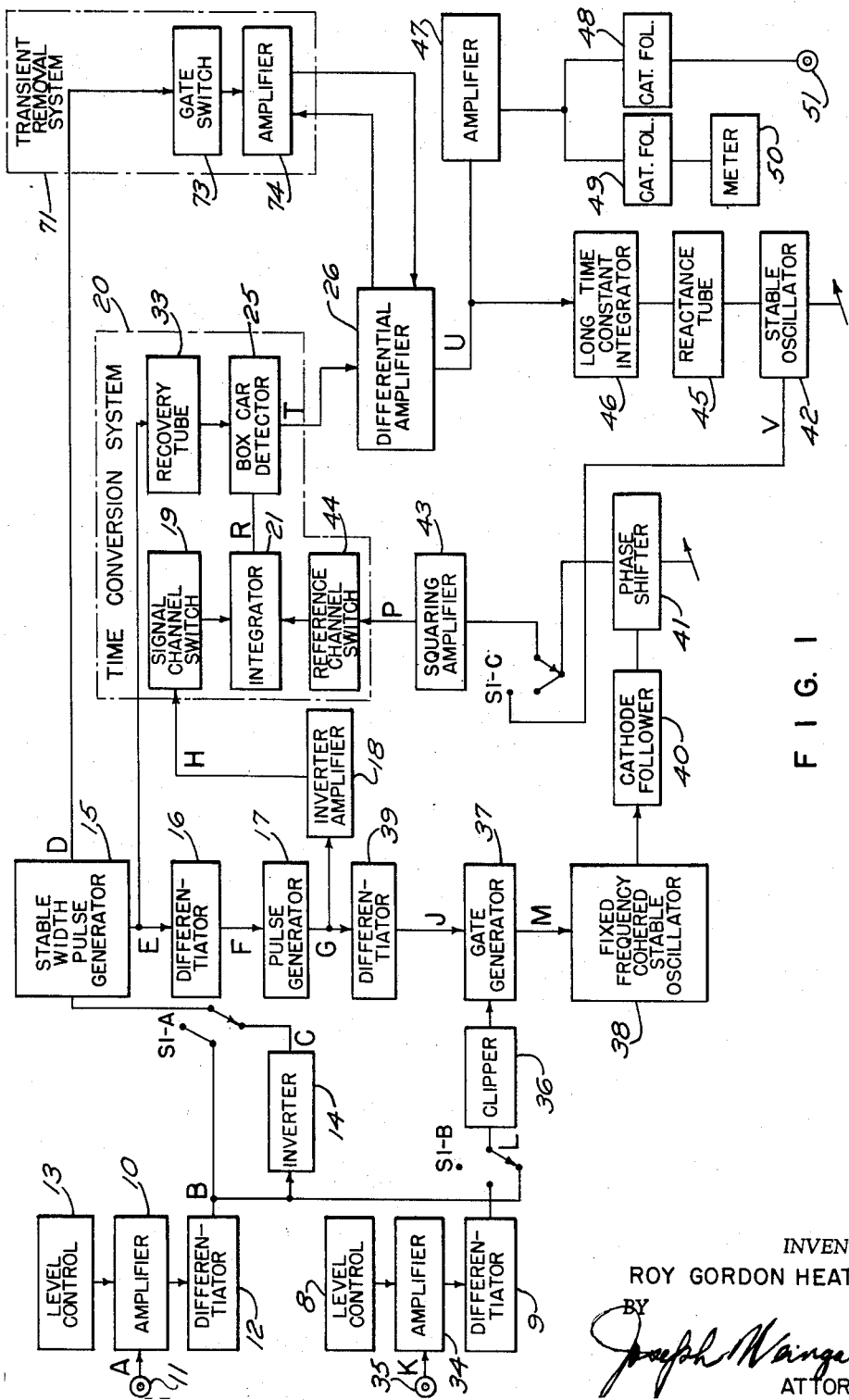
Figure 6:
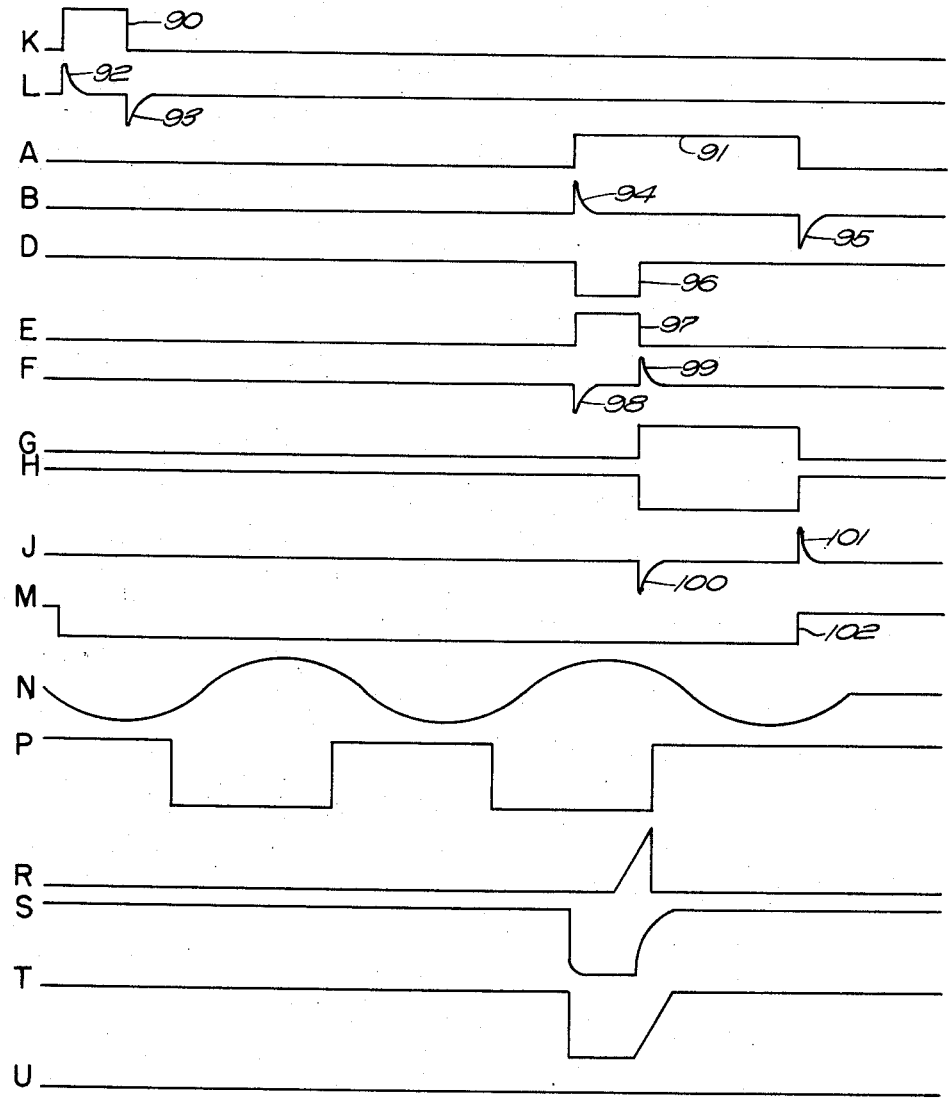
Figure 11:
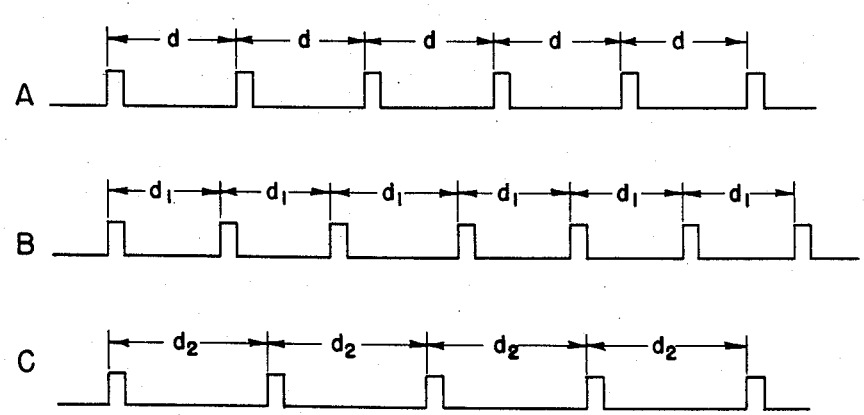
Figure 12:
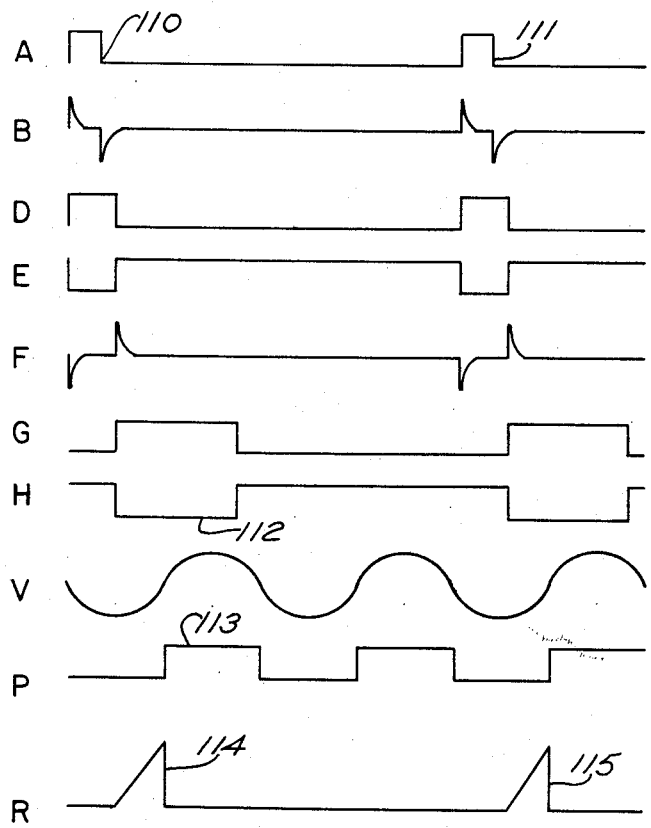

The arrangement of the invention together with its modes of operation may be apprehended by reference to the following detailed description when considered in conjunction with the accompanying drawings in which:

FIG. 1 is a schematic representation of a preferred embodiment of the invention, FIG. 2 depicts the details of the time conversion system employed in the invention, FIG. 3 illustrates certain waveforms occurring at various points in the invention during the measurement of pulse width jitter, FIG. 4 depicts waveforms occurring in the time conversion system of FIG. 2, FIG. 5 illustrates the circuitry comprising the transient removal system, FIG. 6 depicts certain waveforms occurring at various points in the invention during the measurement of relative jitter, FIGS. 7 through 11 are employed to illustrate pulse width jitter, relative jitter, and pulse repetition frequency jitter, FIG. 12 depicts waveforms occurring at various points in the invention during the measurement of pulse repetition frequency jitter.

Figure 7:
Figure 8:
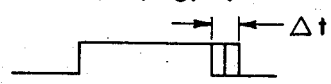

In the determination of the time stability of repetitively generated pulses, there are three broad classes of pulse instability that are commonly of interest. The first class is known as pulse width jitter and is the variation observed in repetitive pulses of the time spacing between the leading edge and the trailing edge of the pulses. FIG. 7 shows three repetitively generated pulses which nominally have the same pulse width. If the three pulses are superimposed with their leading edges aligned, as has been done in the magnified view of FIG. 8, it will be seen that the superimposed pulses are of slightly different widths as indicated by the exaggerated misalignment of the trailing edges, the variation of the pulse width $\Delta t$ being termed the width jitter of the pulses.

Figure 9:
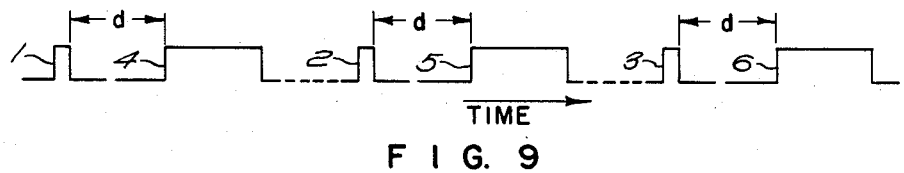
Figure 10:

Relative jitter is the variation in time spacing between corresponding points on two pulses where the two pulses are repetitively generated. In FIG. 9, for example, trigger pulses 1, 2, and 3 are shown which are employed to drive a gate generator whose output is represented by gates 4, 5, and 6, there being a nominal delay $d$ between the leading edge of a trigger pulse and the leading edge of its associated gate. Considering each trigger pulse and its associated gate as a unit, if the units are superimposed, as in FIG. 10, with the leading edges of the trigger pulses aligned, it will be seen that the delay between the leading edge of a trigger and the leading edge of the associated gate is not constant for all units but exhibits a variation $\Delta t$, termed the relative jitter of the gates.

Pulse repetition frequency (PRF) jitter is the variation in time spacing between successive pulses in a train of periodically spaced pulses. FIG. 11A illustrates a train of periodically spaced pulses in which the leading edge of one pulse is spaced from the leading edge of its successive pulse by a distance $d$ which is seemingly the same for any two pulses. If the pulses exhibit a variation causing the distance between consecutive pulses to decrease to a length $d_1$ as shown in FIG. 11B, then the number of pulses which are generated in a time T is increased, that is, the frequency at which the pulses are repeated is increased. Conversely, where the pulses exhibit a variation causing the distance between consecutive pulses to increase to a length $d_2$ (FIG. 11C), then the number of pulses which are generated in a time T is decreased so that the frequency at which the pulses are repeated is decreased. It is seen therefore, that a variation in the distance $d$ between consecutive pulses results in a corresponding variation in the repetition frequency of the pulses and that variation is termed pulse repetition frequency jitter.

Referring now to FIG. 1 which illustrates in schematic form a preferred embodiment of the invention, there is shown an amplifier 10 having its input coupled to a signal input terminal 11 and its output connected to a differentiator 12. Associated with the amplifier is a measurement level control, here indicated by a block 13, although in practice the level control may be simply some arrangement to bias the input of amplifier 10 so that the steepest portion of the input signal may be selected or the smaller undesired pulses or overshoots in the signal channel input may be rejected. The output of differentiator 12 is coupled directly to the upper two contacts of switch S1–A and the third or lowermost contact of that switch is connected to an inverter 14 which inverts the polarity of the output of the differentiator. The switch, of course, may be placed in register with any one of the three contacts. The output of the switch is employed to trigger a pulse generator 15 which can be a monostable multivibrator or may be some other type of relaxation oscillator such as a blocking oscillator. The pulse generator 15 provides two similar rectangular output pulses, the polarity of one of those pulses being inverted with respect to the other pulse. It is essential that the width of the output pulses of generator 15 be highly stable since any jitter in width affects the accuracy of the system. In practice a pulse width of approximately two microseconds' duration has been employed. One output of generator 15 is coupled to a transient removal system whose purpose is explained later. The other output of generator 15 is applied through a differentiator 16 to trigger a pulse generator 17 which emits a rectangular pulse, preferably of five microseconds' duration. Pulse generator 17 may be a relaxation oscillator of any suitable type, such as a monostable multivibrator, blocking oscillator, or phantastron. In connection with generator 17, some jitter in the width of its output pulses can be tolerated and unless that jitter is inordinate, it will not affect the accuracy of the instrument. The output of generator 17 is fed through an inverter amplifier 18 to a signal channel switch 19 which forms a portion of the time conversion system 20. Referring now to the detailed showing in FIG. 2 of the time conversion system, the output of the signal channel switch 19 is, in the absence of an input signal to that switch, connected to ground as symbolically indicated in the box 19. The output of switch 19 is also connected to point R of the integrator circuit 21, that circuit having an integrating capacitor 22 connected across a stable voltage source 23. A resistor 24 is interposed between voltage source 23 and junction R to limit the current drain on that source when the junction is grounded by switch 19. The charge on capacitor 22 is detected by a box car detector 25 (FIG. 1) and the output of that detector is coupled to an input of a differential amplifier 26. The box car detector as shown in FIG. 2 is comprised of diodes 28 and 29, and capacitor 30, the output of the box car detector being derived from the terminal T and across the cathode load resistor 32 of a cathode follower 31. Recovery tube 33 shown in FIGS. 1 and 2, has its input connected to pulse generator 15 and in response to a trigger pulse from that generator, causes the diode 29 (FIG. 2) to provide a discharge path for capacitor 30.

Returning now to FIG. 1, a three position switch S1–B is shown, in which the lowermost contact is connected to the output of differentiator 12, the middle contact is connected to the output of a differentiator 9 whose input is coupled to an amplifier 34 fed from reference input terminal 35, and the uppermost contact is unconnected. The output of switch S1–B is connected to a clipper 36 which permits only positive going pulses to trigger the gate generator 37 and prevents negative going pulses from appearing at its output. The gate generator is preferably a bi-stable multivibrator arranged to be triggered by positive going pulses from clipper 36. Upon being triggered, gate generator 37 provides a negative going wave which is applied to the input of a fixed frequency, cohered, stable oscillator 38. The term "cohered oscillator" denotes an oscillator of the type whose oscillations are coherent with the leading edge of the input gate. That is, the phase of the oscillations referred to the leading edge of the triggering input gate does not change when the oscillator is subjected to being triggered into oscillation and then stopped from oscillating (at the cessation of the gate) and the oscillator is again triggered into oscillation by another gate at some interval after it has ceased to oscillate upon the cessation of the preceding gate. The oscillator 38 is normally biased to cut-off and is arranged so that when the negative going gate from generator 37 is applied, the oscillator immediately commences to oscillate. For example, assuming oscillator 38 to be of the "Clapp" type, it may be clamped "off" (i.e., prevented from oscillating) by the low output impedance of a cathode follower shunting the inductor of the oscillator's high-Q tank circuit. When the negative going gate from generator 37 is impressed on the grid of the cathode follower, the cathode follower is biased to cut off so that its output impedance changes from a low to a high value. The abrupt change in the cathode follower cathode current passing through the oscillator tank coil (i.e., the inductor) results in a transient which initiates oscillation and "coheres" the oscillator. The output of oscillator 38 is sinusoidal and preferably has a frequency in the vicinity of 60 to 100 kilocycles per second. It is important to the operation of the invention that the oscillator be stable, that is, that the output does not change in frequency as any frequency drift will impair the accuracy of the system. The duration of the gate supplied by generator 37 is determined by the output of a differentiator circuit 39 whose input is connected to pulse generator 17. The output of differentiator 39 causes the gate from generator 37 to close concurrently with the trailing edge of the output pulse of generator 17. The sinusoidal output of oscillator 38 is applied through a cathode follower 40 to a phase shifter 41 having a manual control permitting the input oscillation to be shifted in phase through a continuous range from zero to 360°. The purpose of the phase shifter is to provide the time reference information available from the cohered oscillator in the desired phase so that the time sequence of events shown in FIG. 4 can be achieved. The same phase control can be achieved by a variable delay system where a maximum delay of a full cycle is achievable, but the use of a capacitor phase shifter is preferable since all phases are then obtainable at a point in time only a fraction of a cycle after the cohered oscillator begins to oscillate. The output of phase shifter 41 is impressed on the lower two contacts of a three station switch S1–C, the uppermost contact of that switch being connected to an oscillator 42. The sinusoidal signals transmitted through switch S1–C are applied to a squaring amplifier 43 which may comprise a cascade of overdriven amplifier stages. The amplifier 43 changes the sinusoidal waves to a train of rectangular waves having the same periodicity as the sinusoidal signal. The output of squaring amplifier 43 is applied to the reference channel switch 44. Referring now to FIG. 2, reference channel switch 44 has its output connected across integrating capacitor 22. In the absence of a switching signal, the reference channel switch is closed. FIG. 2 illustrates the case when a negative reference pulse has opened the switch, as symbolically indicated by the switch within the box 44. However, when the negative rectangular pulse terminates, the reference channel switch closes and grounds the high side of capacitor 22 again so that the capacitor has a low impedance discharge path to ground.

The sinusoidal oscillator 42 of FIG. 1 is preferably a crystal controlled beat frequency oscillator whose frequency can be manually adjusted. However, other types of sinusoidal oscillators may be used, the two necessary attributes required of such oscillators are high stability (i.e., freedom from frequency drift and from frequency modulation) and an ability to be tuned over a range of frequencies. The oscillator 42 is controlled by a reactance tube 45, the reactance tube in turn being governed by an integrating circuit 46 having a long time constant. The long time constant circuit integrates the output of differential amplifier 26.

The output differential amplifier 26 is fed through an amplifier 47 to a pair of cathode followers 48 and 49, the output of one of those cathode followers being applied to a meter 50 which is calibrated to indicate jitter in volts, and the output of the other cathode follower is applied to a monitor terminal 51 to which an oscilloscope may be connected when it is desired to view the jitter waveform.

In order to prepare the system of FIG. 1 to measure pulse width jitter, the switches S1–A, S1–B, and S1–C are set to stations in which the lowermost contact is connected to the movable element. Preferably, the three switches are contained in one assembly and the movable elements are connected to move as a unit. The operation of the system in measuring pulse width jitter will be explained in conjunction with the waveforms illustrated in FIG. 3, the waveforms being plotted against a common time scale to show the time relationship existing between the various waveforms occurring at different points in the system. The pulses whose jitter is to be measured are applied at the signal input terminal 11, it being understood that pulses may be regularly or irregularly spaced without affecting the jitter measurement of the system. A pair of input pulses 53 and 54 are shown in FIG. 3A, the pulse 54 having a width greater than the width of pulse 53, and the difference in widths between those two pulses being purposely exaggerated to aid the reader in apprehending the invention's operation. Treating only pulse 53 for the present, the leading edge of that pulse is employed as a time reference against which the time of occurrence of the trailing edge is compared. The pulse 53, impressed on terminal 11, is fed through amplifier 10 and thence through differentiator 12, the output of that differentiator being a pair of voltage "spikes" 55 and 56 which are respectively contemporaneous with the leading and trailing edges of the input pulse 53 as indicated in FIG. 3B. The negative spike 56 causes inverter amplifier 14 to emit a positive trigger 57 (FIG. 3C), coincident with the trailing edge of the input pulse, which is transmitted through switch S1-A and causes pulse generator 15 to be triggered into operation. Generator 15 is sensitive only to positive pulses. Pulse generator 15 provides a pair of pulses, 58, 59, shown in FIGS. 3D and 3E, having a fixed duration of about two microseconds and whose leading edges are coincident with the trigger 57. The positive pulse 59 is applied to a recovery tube 33, causing that tube to drive the cathode of diode 29 (FIG. 2) in a negative direction so that capacitor 30 (FIG. 2), if it was previously charged, discharges to ground or to a lower positive potential during the two microsecond duration of pulse 59. The waveform at the output of recovery tube 33 is shown in FIG. 3S. The negative pulse 58 from the output of generator 15 is transmitted to the transient removal system whose operation will presently be described. Positive pulse 59 is also applied to an inverter differentiator 16 whose output is a pair of triggers 60 and 61, shown in FIG. 3F, which are contemporaneous with the leading and trailing edges of pulse 59. Only the positive going trigger 61 is of interest, the other spike 60 being suppressed by a clipper, if desired. To eliminate the necessity for a clipping stage, pulse generator 17 is arranged to respond only to a positive going input and, therefore, when trigger 61 is applied to generator 17, that generator emits a pulse, shown in FIG. 3G, having a duration of about five microseconds. The output of generator 17 is fed into an amplifier 18 which inverts the waveform as shown by FIG. 3H, and the negative going pulse is then applied to the input of signal channel switch 19 in the time conversion system 20. It is apparent, that if generator 17 were a multivibrator, a negative output pulse would be available directly from the generator and, therefore, the amplifier 18 could be eliminated. As indicated in FIG. 2, signal channel switch 19, in the absence of a signal, is closed so that the high side of capacitor 22 is held at ground, ground being a datum level from which the charging of capacitor 22 is to commence. Upon the impress of the waveform of FIG. 3H, signal channel switch 19 opens and capacitor 22 commences to charge from the source 23. Capacitor 22 continues to charge until reference channel switch 44 closes and grounds the high side of that capacitor. The closing of reference channel switch 44 occurs at a fixed but adjustable interval after the leading edge of input pulse 53. Returning to FIG. 1, the output triggers of differentiator 12, the spikes 55 and 56 of FIG. 3B, are transmitted through switch S1-B to clipper 36, as indicated in FIG. 3L, and that clipper permits the positive spike 55 to pass to its output but "clips" or removes the negative spike 56. Gate generator 37, upon the impress of spike 55 at its input, emits a negative-going gate, shown in FIG. 3M, and that gate causes cohered oscillator 38 to be "kicked" into oscillation. The output of oscillator 38 is the sinusoidal waveform shown in FIG. 3N. The oscillator is arranged so that its initial swing is always a negative going half cycle, wherefor the oscillations are invariably coherent with the leading edge of the triggering gate. The output of oscillator 38 is coupled through cathode follower 40, which acts as a buffer stage, to phase shifter 41. The operator of the instrument manually adjusts the phase shifter until the pointer of meter 52 (FIG. 2) is positioned on an index mark. By adjusting phase shifter 41, the output of the phase shifter is, in effect, moved by a selected time; that is, the sinusoidal waveform shown in FIG. 3N may, in effect, be shifted to the right or the left. The maximum amount of shift that can be effected by the phase shifter, preferably, is 360° which is equivalent to one cycle of oscillation otherwise known as the "period" T of the oscillations. The sine wave output of phase shifter 41 is converted to a train of rectangular pulses by squaring amplifier 43 as indicated by FIG. 3P. When the phase of the sine waves of FIG. 3N is shifted by phase shifter 41, the rectangular pulses of FIG. 3P are shifted in time because the rectangular pulses are derived from the sine wave. The phase shifter, therefore, is effective to move a rectangular pulse of FIG. 3P to any desired position along the time axis within a range equal to T. The time shifted rectangular pulse is applied to reference channel switch 44. That switch is normally held closed, and upon the impress of a rectangular pulse, the switch is caused to open as indicated in FIG. 2, grounding the high side of capacitor 22 so that the capacitor immediately discharges to ground. Therefore, the closing of reference channel switch 44 prevents any charge from accumulating on capacitor 22.

Considering now the time conversion system of FIG. 2 in conjunction with the time sequence of events occurring in that system, illustrated in FIG. 4, and assuming that capacitor 30 has been previously charged to some voltage sufficient to cause the voltage appearing at terminal T to be maintained at the +V level shown in FIG. 4T, then the input pulse 59 (FIG. 4E) applied to the input of recovery tube 33 causes capacitor 30 to discharge to ground or to a low positive potential through diode 29. Since the voltage at terminal T of cathode follower 31 follows the voltage on capacitor 30, the potential at terminal T drops to a reference level, denoted as the zero level in FIG. 4T. At the conclusion of pulse 59 capacitor 30 is uncharged and the cathode of diode 29 is again raised to some positive potential permitting capacitor 30 to be charged. At the conclusion of pulse 59, a signal pulse 62 (FIG. 4H), whose leading edge is coincident with the trailing edge of pulse 59, is applied to the input of signal channel switch 19, causing that switch to open whereupon capacitor 22 commences to charge through resistor 24 toward the potential of stable voltage source 23 as indicated by the waveform of FIG. 4R. As capacitor 22 charges, cathode follower 27 raises the potential on the anode of diode 28 in correspondence with the charge on capacitor 22, thereby causing capacitor 30 to charge through diode 28. The effect of this is that the charge on capacitor 30 follows the charge on capacitor 22 while the latter capacitor is charging. Capacitor 22 continues to charge until the trailing edge of the delayed reference pulse 63 (FIG. 4P) arrives from squaring amplifier 43 of FIG. 1. The trailing edge of delayed negative reference pulse 63 causes reference channel switch 44 to close and ground the high side of capacitor 22. Capacitor 22 immediately discharges to ground as indicated in FIG. 4R, but diode 28 prevents capacitor 30 from discharging so the latter capacitor retains its peak charge. Since the cathode follower 31 follows the charge on capacitor 30, the output obtained at terminal T is the waveform illustrated in FIG. 4T. Because the leading edge of signal pulse 62 (FIG. 3H) is generated after a fixed delay of about two microseconds after the trailing edge of the input pulse 53 (FIG. 3A) and the trailing edge of reference pulse 63 is spaced in time from the leading edge of input pulse 53 by a constant amount, the time $t$ (FIG. 4R) during which capacitor 22 charges is determined by the width of the input pulse 53.

The integrator circuit 21 (FIG. 2) is arranged so that capacitor 22 charges linearly and hence the peak charge on capacitor 22 is inversely proportional to the width of the input pulse. That is, the greater the width of the input pulse applied at terminal 11 (FIG. 1), the less will be the peak charge on capacitor 22. Conversely, the narrower the width of the input pulse, the greater will be the peak charge on capacitor 22. Consider the pulse 54 of FIG. 3A, for example, which is of greater width than the pulse 53. The sequence of events caused by input pulse 54 occurring in the time conversion system is shown at the right in FIG. 4. The trailing edge of input pulse 54 is further removed from the leading edge of input pulse 54 than are the corresponding edges of input pulse 53. Since the trailing edge of reference pulse 68 (FIG. 4P) is delayed a preset interval after the occurrence of the leading edge of input pulse 54 and the leading edge of pulse 67 is generated a fixed time (approximately two microseconds) after the trailing edge of input pulse 54, the capacitor 22 (FIG. 2) can charge only during the time interval y (FIG. 4R). Charging of the capacitor 22 is indicated by the sawtooth waveform 69 which is of lesser amplitude than the sawtooth waveform 64 due to input pulse 54. The peak amplitude of the integrator sawtooth (FIG. 4R) is detected and stored in capacitor 30 (FIG. 2), and the charge in capacitor 30 (FIG. 4T) which was at the $+V_1$ level due to pulse 53 level falls to the $+V_2$ level as a result of the jitter in the width of input pulse 54. The difference in voltage levels between $V_1$ and $V_2$ is therefore a measure of pulse width jitter. Now, the output which is of interest is the difference in voltage between the levels V, $V_1$, and $V_2$ of FIG. 4T (the desired output being as represented in FIG. 3U), since the difference in levels is the measure of pulse width jitter whereas the levels themselves represent the widths of the input pulses. Hence the "valleys" in FIG. 4T caused by pulses 65 and 70 are distinctly undesirable and should be removed in order to prevent erroneous output indications in a meter circuit intended to display the change in voltage levels representing time jitter. Those "valleys" or transients are removed by the transient removal system 71 shown in FIG. 1. The removal system has a cathode follower gate switch 73 which couples the two microsecond output pulse (FIG. 3D) from pulse generator 15 into a differential amplifier 74 having a second input derived from differential amplifier 26.

FIG. 5 shows circuitry corresponding to gate switch 73, amplifier 74, and differential amplifier 26. It will be noted that tube 31 and capacitor 30 of FIG. 5 are the same elements illustrated in FIG. 2. The charge on capacitor 30 varies in the manner depicted by the waveform of FIG. 3T. Assuming that capacitor 30 is initially charged to a level V, tube 31 conducts a current which flows through resistors 32 and 75 and causes the cathode of tube 31 to be maintained at a constant potential to which capacitor 76 is charged. The charge on capacitor 76 results in the output 77 of cathode follower 78 appearing as a direct voltage 79. The gate switch 73 is arranged as a cathode follower and is biased "on" in the absence of a signal from coupling capacitor 72. Tube 82 is normally biased "off." Tube 83 is biased to full current conduction so that its low plate potential causes tube 80 to be biased off. The pulse 58 (FIG. 3D) from pulse generator 15 (FIG. 1) is coupled to the grid of gate switch 73 causing that tube to be cut off. The potentials on the grids of tubes 82 and 83, therefore, become equal and the current which formerly flowed through tube 83 now divides equally between tubes 82 and 83. The voltage at the plate of tube 83 rises, due to the decrease in current through that tube, so that tube 80 is biased into conduction. Simultaneously, the charge in capacitor 30 drops as indicated by pulse 65 in FIG. 3T. Now, the pulse 65 on the grid of tube 31 causes that tube to decrease its current conduction and consequently the current flow through resistors 32 and 75 tends to decrease. However, because tube 80 is biased into conduction, a current flows through resistor 75, tube 80, and resistor 32 which ideally just offsets the decrease in current through tube 31 so that no change in potential occurs at point 84. Now if the current through tube 80 is not sufficient to offset the decrease in current through tube 31, a rise in voltage occurs at the plate of tube 31 which is coupled through capacitor 85 to the grid of tube 82 and causes that tube to draw more current thereby raising the potential at junction 86. The plate potential of tube 83, consequently, rises, causing tube 80 to draw more current until the current through tube 80 just offsets the decrease in current through tube 31. Hence, the potential at the cathode of tube 31 (the junction 84) does not change materially. Referring now to FIG. 3T, it can be seen that the leading edge of pulse 65 has an amplitude V whereas the trailing edge has a larger amplitude $V_1$. Therefore, at the termination of pulses 58 and 65, the grid of tube 31 (FIG. 5) will be maintained at voltage $V_1$ causing that tube to conduct a current of sufficient magnitude to raise the potential at point 84. The capacitor 76 charges to the new potential level at point 84 and the output of cathode follower 78, consequently, rises to the level 87. The waveform derived from terminal 77 is, hence, a stepped waveform of the type shown in FIG. 3U. It is to be understood, that the stepped waveform in FIG. 3U illustrates the ideal case in which the transients are completely removed. In a practical instrument, some vestige of the transients may remain in the stepped waveform, but the circuitry of the following stages can be designed in known ways to reduce the effects of the vestiges.

The system of FIG. 1 is placed in condition to measure relative jitter by setting switches S1-A, S1-B, and S1-C so that connections are made to the middle contacts. Switch S1-A, therefore, connects the output of differentiator 12 directly to the input of pulse generator 15; switch S1-B transmits the output of differentiator 9 to clipper 36, and switch S1-C connects the phase shifter 41 to the input of squaring amplifier 43. It will be recalled that relative jitter involves a time measurement between two related pulses. The leading edge of the first pulse is used as a reference from which the jitter of the leading edge of the second pulse is determined. The first pulse 90, shown in FIG. 6K is applied to reference input terminal 35 and the second pulse, pulse 91, shown in FIG. 6A, is applied at signal input 11. Considering first the effect of the pulse 90 impressed at reference input terminal 35, that pulse is amplified without inversion by amplifier 34, the amplifier preferably having a level control 8 permitting the grid of the amplifier to be biased to select the steepest portion of the input waveform. The output of amplifier 34 is fed through differentiator 9, resulting in a pair of voltage spikes 92 and 93 (FIG. 6L), the spike 92 being contemporaneous with the leading edge of pluse 90. Clipper 36 removes spike 93 and allows spike 92 to be transmitted to the input gate generator 37. Upon reception of spike 92, generator 37 emits a negative gate (FIG. 6M) whose leading edge causes oscillator 38 to commence oscillating, the output of cohered oscillator 35 being illustrated in FIG. 6N. It will be noted that the initial swing of the oscillations is a negative half-cycle so that the oscillations are coherent with the leading edge of the triggering gate. The output of oscillator 38 is fed through cathode follower 40 to phase shifter 41. The phase shifter is manually adjusted until the desired reading is noted on milliammeter 52 (FIG. 2). As previously described, phase shifter 41 effectively changes the phase of the transmission of the sinusoidal waves derived from oscillator 35. The output of phase shifter 41 is transmitted through switch S1-C to squaring amplifier 43, the output of the squaring amplifier being the rectangular pulses depicted in FIG. 6P which are applied to reference channel switch 44.

Considering now the effect of the second pulse 91 (FIG.

6A) applied at signal input terminal 11, the pulse is amplified without inversion by amplifier 10 and is then fed into differentiator 12, the output of that differentiator being a pair of triggers 94 and 95, shown in FIG. 6B, which are respectively contemporaneous with leading and trailing edges of pulse 91. Trigger 95 is not used and may be suppressed, if desired. Trigger 94, however, is transmitted through switch S1–A to pulse generator 15 which thereupon generates rectangular pulses 96 and 97 (FIGS. 6D and 6E), each pulse being about two microseconds in duration. Pulse 96 is applied to transient removal system 71 whose operation was described above. Pulse 97 is applied to recovery tube 33 in time conversion system 20 and the action of that tube is the same as previously described. Pulse 97 is also applied to the input of inverter differentiator 16 resulting in a pair of triggers 98 and 99 (FIG. 6F) at the output of that differentiator, the trigger 99 being contemporaneous with the trailing edge of pulse 97. Only trigger 99 is of interest and pulse 98 may be suppressed, if desired. Trigger 99 causes generator 17 to emit a rectangular pulse (FIG. 6G) having a duration of about five microseconds, the leading edge of that rectangular pulse being contemporaneous with trigger 99. The rectangular pulse (FIG. 6G) is inverted and applied to the input of differentiator 39, the output of that differentiator being a pair of triggers 100 and 101, as indicated in FIG. 6J. The trigger 101 causes the gate generator 37 to return to its initial condition thus closing the gate as indicated by the waveform 102 in FIG. 6M. The rectangular pulse from generator 17 is inverted by amplifier 18 as indicated in FIG. 6H (or the inverted pulse, if available, may be obtained at another point in the generator 17) and this inverted pulse is applied to signal channel switch 19 in time conversion system 20.

The operation of the time conversion system, differential amplifier 26, and the output stages 47, 48, and 49 are the same as previously described in connection with the measurement of pulse width jitter.

In the third mode of operation of the invention, that is, when the system of FIG. 1 is employed to measure pulse repetition frequency (PRF) jitter (also known as pulse repetition rate jitter), the switches S1–A, S1–B, and S1–C are positioned to make connection with the uppermost contacts. When the switches are so positioned, clipper 36, gate generator 37, oscillator 38, cathode follower 40, and phase shifter 41 are, in effect, disconnected from the system, and the output of stable oscillator 42 is substituted as the input to squaring amplifier 43 in place of the output from phase shifter 41. A train of pulses of the type shown in FIG. 11 is applied to signal input terminal 11 of FIG. 1. Each pulse of that train will have the same effect as the pulse 91 (FIG. 6A) previously discussed in connection with the measurement of relative jitter. The leading edge of each pulse in the train causes a sequence of events to occur resulting in the generation of waveforms similar to those shown in FIG. 6B through 6H. Hence the input to signal channel switch 19 (FIG. 1) is a rectangular pulse similar to the pulse of FIG. 6H, the leading edge of that pulse being delayed about two microseconds from the leading edge of the input train pulse impressed at terminal 11. Stable oscillator 42 is tuned in frequency by the operator until its frequency of oscillation is at or very close to a harmonic of the pulse repetition frequency. The feedback loop utilizing the reactance tube 45 then locks the stable oscillator 42 accurately on the exact harmonic of the input PRF. After locking occurs, stable oscillator 42 is further tuned to adjust its phase relative to that of the PRF pulse to the center of the dynamic range of the conversion system as indicated by the pointer on milliammeter 52 (FIG. 2) moving to an index mark on the meter, indicating a desired magnitude of charge on capacitor 30. The output of differential amplifier 26 is the input to integrator 46 whose time constant is long compared to one period of the "disturbance" frequency which is modulating the pulse repetition frequency and causing the time jitter, so that the frequency of oscillator 42 does not follow short term variations in the pulse repetition frequency but does follow a slow shift or drift in repetition frequency of the input pulse train.

To illustrate the third mode of operation, assume that two pulses 110 and 111 (FIG. 12A) are arbitrarily selected from the input pulse train to be examined for jitter, and that stable oscillator 42 is tuned to a second harmonic of the pulse repetition frequency. The leading edge of input pulse 110 sets into action a sequence of events resulting in the generation of the five microseconds pulse 112 (FIG. 12H) whose leading edge is displaced two microseconds from the leading edge of pulse 110 (FIG. 12A). The pulse 112 is the input to signal channel switch 19 (FIG. 2) in the time conversion system. The output of oscillator 42 (FIG. 1) is depicted by the sinusoidal waveform of FIG. 12V. The sinusoidal waves are converted to rectangular pulses (FIG. 12P) by squaring amplifier 43 (FIG. 1), those rectangular pulses constituting the input to reference channel switch 44. The time during which capacitor 22 (FIG. 2) charges is determined by the leading edge of pulse 112 (FIG. 12H) and a rising edge of waveform 113 (FIG. 12P), hence capacitor 22 charges as shown by the sawtooth waveform 114 in FIG. 12R.

If the input pulse 111 (FIG. 12A) exhibits no jitter, it is spaced in time from pulse 110 by precisely the time required by oscillator 42 to complete two cycles of oscillation and therefore pulse 111 will cause capacitor 22 (FIG. 2) to charge, as indicated by sawtooth 115 in FIG. 12R, to the same peak as sawtooth wave 114. Any jitter in pulse 111 will cause capacitor 22 to charge to a peak voltage different from the peak of sawtooth 114. The peak voltages are subsequently detected as previously described and the output derived is a stepped waveform of the type shown in FIG. 3U.

The pulse jitter measuring system described herein, in addition to measuring the three common classes of jitter (i.e., pulse width jitter, relative jitter, and PRF jitter), may also be employed to measure "anode delay" time. Anode delay time is defined as the time delay in the firing of a gaseous discharge tube such as a hydrogen thyratron; it is determined by measuring the time (not the time variation) between the input trigger pulse and the output pulse of the gaseous discharge tube. This delay, in the case of a hydrogen thyratron, is of the order of a microsecond. In measuring anode delay time, switches S1–A, S1–B, and S1–C are set to connect the movable elements to the center contacts. Those switches, therefore, are in the same positions used for the measurement of relative jitter and the waveforms shown in FIG. 6 will be employed in explaining the method of measuring anode delay time. Assuming pulse 90 (FIG. 6K) to be the input trigger to a hydrogen thyratron and pulse 91 (FIG. 6A) to be the thyratron's output pulse, and further assuming that the leading edge of trigger 90 is spaced from the leading edge of pulse 91 by approximately one microsecond, the impress of pulse K at reference input terminal 35 of FIG. 1 causes gate generator 37 to emit a negative going gate (FIG. 6M) whose leading edge turns on cohered oscillator 38. About one microsecond later, pulse 91 (FIG. 6A) is impressed at signal input terminal 11 of FIG. 1 and some seven microseconds later pulse 101 (FIG. 6J) closes the gate (FIG. 6M) thereby turning off cohered oscillator 38. The duration of the gate (FIG. 6M) is about eight microseconds and since the frequency of cohered oscillator 38 is not more than one hundred kilocycles, the oscillator 38 makes less than one full cycle during the time it is on. From FIGS. 6N and 6P, it can be inferred that only one negative going rectangular pulse is derived from each cycle of oscillator 38. If the oscillator makes only one cycle of oscillation, no ambiguity exists as to the derived rectangular pulse. Now setting phase shifter 41 is to provide a charge on capacitor 30

(FIG. 2) of $V_1$ volts as shown in FIG. 4T, and assuming the voltage drops to the $V_2$ level after four or five minutes because of a change in anode delay time, by adjusting phase shifter 41 the voltage level can be brought back to the $V_1$ level. The amount of phase shift necessary to restore the voltage to the $V_1$ level is a direct measure of the change in anode delay time and the phase shifter can be calibrated to read anode delay time in microseconds or a conversion chart may be used to change degrees of phase shift to delay in microseconds.

While a preferred embodiment of the invention has been illustrated in FIGS. 1, 2, and 5, it is to be understood that modifications may be made without departing from the essence of the invention. It is therefore intended that the invention not be restricted to the precise embodiment shown in the drawings, but rather that the scope of the invention be determined in accordance with the appended claims.

I claim:

1. A pulse jitter tester comprising an integrator and a source of electric potential connected thereto for charging said integrator, switching apparatus connected to said integrator, said apparatus maintaining the charge in said integrator at a reference level, means for generating a reference signal which includes an adjustable mechanism for shifting said reference signal in time, means for generating a first signal whose position in time relative to said reference signal varies in correspondence with the jitter of the pulse subject to the measurement, and means for applying said first signal and said reference signal to said switching apparatus, said apparatus causing said integrator to charge during the simultaneous occurrence of said first signal and said reference signal.

2. A device for measuring the jitter of repetitively generated pulses comprising, first means for generating a reference switching signal for each pulse whose jitter is to be measured, said first means including a mechanism for shifting said reference signal in time, means for generating a second switching signal whose time relation to said reference signal varies in correspondence with the jitter of the measured pulse, a capacitor, a source of electric potential for charging said capacitor, switching means connected between said capacitor and said source, said switching means in the absence of a switching signal maintaining the charge in said capacitor at a datum level, and means for applying said switching signals to actuate said switching means, said switching means in response to said switching signals causing said capacitor to charge during the time interval in which said second switching signal and said reference switching signal overlap.

3. A device for measuring pulse jitter comprising a capacitor, a source of electric potential for charging said capacitor, a first switch connected between said source and said capacitor, said first switch in the absence of a switching signal maintaining the charge in said capacitor at a datum level, a second switch connected between said source and said capacitor, signal generating means coupled to said second switch for generating a reference signal, said signal generating means including a mechanism for selectively shifting said reference signal in time, said reference signal conditioning said second switch to permit charging of said capacitor, signal generating means coupled to said first switch for generating a switching signal whose time relation to said reference signal varies in correspondence with the jitter of the pulse which is the subject of the measurement, said first switch being actuated by said switching signal to cause said capacitor to charge, and means coupled to said capacitor for determining the charge on said capacitor.

4. A device for measuring pulse jitter comprising a capacitor, a source of electric potential for charging said capacitor, a first switch connected between said source and said capacitor, said first switch in the absence of a switching signal maintaining the charge in said capacitor at a datum level, a second switch connected between said source and said capacitor, first signal generating means coupled to one of the two switches for generating a reference signal, said first signal generating means including a mechanism for selectively shifting said reference signal in time, second signal generating means coupled to the other of said switches for generating a switching signal whose position in time relative to said reference signal varies in correspondence with the jitter of the pulse which is the subject of the measurement, said switches in response to said switching and reference signals causing said capacitor to be connected across said source during the time interval in which said switching and reference signals overlap, and means connected to said capacitor for determining the charge on said capacitor.

5. A pulse jitter tester comprising a capacitor, a source of potential for charging said capacitor, switching apparatus connected between said capacitor and said source, said apparatus in the absence of a switching signal maintaining the charge in said capacitor at a datum level, a signal input terminal, means connected to said terminal for generating a first switching signal whose position in time varies in accordance with the jitter of the input signal pulse, a reference input terminal, means connected to said reference input terminal for deriving a reference switching signal from an input reference pulse, means for varying the position of the reference switching signal to cause it to overlap the first switching signal, and means for applying said first switching signal and said reference switching signal to said apparatus, said apparatus in response to the simultaneous existence of said switching signals causing said capacitor to charge, and said apparatus in response to the termination of said reference switching signal preventing further charging of said capacitor.

6. A device for measuring jitter between repetitively generated reference pulses and repetitively generated pulses which are the subject of the measurement comprising, means for deriving a first trigger signal from an edge of a reference pulse, means for deriving a second trigger signal from a corresponding edge of a subject pulse, means responsive to said first trigger signal for generating a reference switching signal and such means including an adjustable mechanism for shifting said reference switching signal in time, means responsive to said second trigger pulse for generating a second switching signal, a capacitor, a source of electric potential for charging said capacitor, switching apparatus connected between said capacitor and said source, said apparatus in the absence of a switching signal maintaining the charge on said capacitor at a datum level, means for applying said reference switching signal and said second switching signal to said switching apparatus to cause said capacitor to charge from said source for the time interval in which said switching signals are coexistent, and means for determining the variation in charge on said capacitor caused by successive measurements.

7. A time conversion system comprising a first capacitor, a source of electric potential for charging said first capacitor, a first switch connected between said source and said first capacitor, a second switch connected between said source and said first capacitor, one of said switches normally maintaining the charge in said first capacitor at a datum level and causing said first capacitor to charge from said source in response to a first switching signal, the other of said switches being responsive to a second switching signal to prevent further charging of said first capacitor, a storage capacitor, means detecting the peak charge on said first capacitor and applying said detected signal to said storage capacitor, means responsive to a recovery pulse for discharging said storage capacitor, and means for determining the variation of the charge in said storage capacitor.

8. A pulse jitter measuring system comprising a signal input terminal, means for deriving a first trigger from each pulse impressed at said input terminal, a first generator responsive to said first trigger for providing a stable width pulse, means coupled to the output of said first pulse generator for deriving a second trigger delayed in time from said first trigger, a second generator responsive to said second trigger for providing a signal switching pulse, a reference input terminal, means for deriving a third trigger from each pulse impressed at said reference input terminal, a gate generator responsive to said third trigger for supplying a gate signal, a fixed frequency cohered oscillator having its output coupled to a phase shifter, actuation of said oscillator being controlled by said gate signal, means coupled to the output of said phase shifter for deriving a reference switching pulse therefrom, a capacitor, a source of potential for charging said capacitor, switching apparatus for controlling the charging of said capacitor, and means for coupling said reference switching pulse and said signal switching pulse to said switching apparatus to cause said capacitor to charge during the interval in which said switching pulses are coexistent.

9. A pulse jitter measuring system according to claim 8, further comprised by a box car detector for detecting the peak charge on said capacitor, a transient removal system gated by the output of said first generator, and a differential amplifier having one input coupled to said box car detector and the second input connected to said transient removal system.

10. A pulse jitter measuring system according to claim 9, in which said box car detector has a storage capacitor for storing the detected signal, and said measuring system further includes a recovery tube connected between said first generator and said box car detector whereby said recovery tube in response to an output pulse from said first generator causes said storage capacitor to discharge.

11. A pulse jitter measuring system according to claim 10, and in which said transient removal system includes a gate switch and a differential amplifier gated by said gate switch.

12. A pulse jitter measuring system comprising a signal input terminal coupled to the input of a first differentiator, a stable width pulse generator having its input coupled to the output of said first differentiator, means for deriving a trigger from the output of said stable width pulse generator, a second pulse generator responsive to said trigger for generating a first switching signal, a tunable stable oscillator, a squaring amplifier connected to the output of said oscillator, said squaring amplifier providing a time stable reference switching signal, a capacitor, a source of potential for charging said capacitor, switching apparatus for controlling the charging of said capacitor, and means for coupling said switching signals to said switching apparatus to cause said capacitor to charge during the interval in which said first switching signal and said reference switching signal coexist.

13. A pulse jitter measuring system according to claim 12, further including a reactance tube for controlling the frequency of said oscillator, an integrating circuit for regulating said reactance tube, a box car detector for detecting the peak charge on said capacitor, and means coupling the output of said detector to the input of said integrating circuit.

14. A pulse jitter measuring system according to claim 13, in which said box car detector has a storage capacitor for storing the detected signal, and said measuring system further includes a recovery tube connected between the output of said stable width pulse generator and said box car detector whereby said recovery tube causes said storage capacitor to discharge in response to a pulse from said stable width pulse generator.

15. A pulse jitter measuring system according to claim 14, further including a transient removal system gated by said stable width pulse generator, said transient removal system removing the transients caused by the rapid discharge of said storage capacitor.

16. A pulse jitter measuring system comprising, a signal input terminal coupled to the input of a first differentiator, a first generator for providing pulses of stable width, a signal inverter coupled to the output of said first differentiator, a first switch for coupling the output of said first differentiator or said inverter to the input of said first generator, a second differentiator connecting the output of said first generator to the input of a second pulse generator, a capacitor, a source of potential for charging said capacitor, a pair of channel switches controlling the charging of said capacitor, means coupling the output of said second generator to one of said channel switches, a fixed frequency cohered oscillator, a gate generator controlling the activation of said cohered oscillator, a phase shifter having its input coupled to the output of said cohered oscillator, a squaring amplifier, a second switch for connecting the output of said phase shifter to the input of said squaring amplifier, and means coupling the output of said squaring amplifier to the other of said channel switches.

17. A pulse jitter measuring system according to claim 16, further including a reference input terminal coupled to the input of a third differentiator, and a third switch for selectively coupling the output of said first or third differentiator to the input of said gate generator.

18. A pulse jitter measuring system according to claim 17, further comprised by a tunable stable oscillator having its output selectively connectible through said second switch to the input of said squaring amplifier.

19. A pulse jitter measuring system according to claim 18, further including a box car detector for detecting the peak charge on said capacitor, means coupling the output of said detector to the input of an integrator having a long time constant, and a reactance tube governed by the output of said integrator and controlling the frequency of said stable oscillator.

20. A pulse jitter measuring system according to claim 19, in which said box car detector has a storage capacitor for storing detected signals, and said measuring system further includes a recovery tube connected between the output of said first generator and said box car detector, said recovery tube in response to a stable width pulse causing said storage capacitor to discharge.

References Cited in the file of this patent

UNITED STATES PATENTS

| | | |
|---|---|---|
| 2,727,209 | Mayer | Dec. 13, 1955 |
| 2,877,414 | Pope | Mar. 10, 1959 |